(12) United States Patent
Margalef et al.

(10) Patent No.: US 8,744,482 B2
(45) Date of Patent: Jun. 3, 2014

(54) APPARATUS AND METHOD FOR WIRELESS DEVICE DETECTION

(75) Inventors: Jordi Virgili Margalef, Valls (ES);
Sameer Deshpande, Maharashtra (IN);
Daniel Cirujano Cuesta, Munich (DE)

(73) Assignee: Lear Corporation, Southfield, MI (US)

( * ) Notice: Subject to any disclaimer, the term of this patent is extended or adjusted under 35 U.S.C. 154(b) by 114 days.

(21) Appl. No.: 13/342,302

(22) Filed: Jan. 3, 2012

(65) Prior Publication Data

US 2012/0244877 A1    Sep. 27, 2012

Related U.S. Application Data

(60) Provisional application No. 61/467,740, filed on Mar. 25, 2011.

(51) Int. Cl.
*H04W 24/00*    (2009.01)

(52) U.S. Cl.
USPC ............. 455/456.1; 455/67.11; 342/451; 340/5.72; 340/5.61

(58) Field of Classification Search
USPC ............ 455/456.1, 67.11; 379/21; 340/5.72, 340/5.61, 436, 10.2, 903, 438, 12.54; 342/451, 42, 457, 50, 51; 701/117; 705/13
See application file for complete search history.

(56) References Cited

U.S. PATENT DOCUMENTS

| | | | | |
|---|---|---|---|---|
| 4,873,530 A * | 10/1989 | Takeuchi et al. | ............... | 343/711 |
| 4,978,963 A * | 12/1990 | Thorpe | ............... | 342/433 |
| 5,524,044 A * | 6/1996 | Takeda | ............... | 455/571 |
| 5,532,709 A * | 7/1996 | Talty | ............... | 343/819 |
| 5,598,167 A * | 1/1997 | Zijderhand | ............... | 342/457 |
| 5,600,302 A * | 2/1997 | Lewis | ............... | 340/457 |
| 5,710,548 A * | 1/1998 | LeMense | ............... | 340/12.22 |
| 6,906,612 B2 * | 6/2005 | Ghabra et al. | ............... | 340/5.61 |
| 7,667,590 B1 * | 2/2010 | Ryan et al. | ............... | 340/539.1 |
| 2006/0114100 A1 | 6/2006 | Ghabra et al. | | |
| 2007/0200672 A1 * | 8/2007 | McBride et al. | ............... | 340/5.72 |
| 2008/0048829 A1 * | 2/2008 | Nakajima et al. | ............... | 340/5.72 |
| 2010/0076622 A1 | 3/2010 | Dickerhoof et al. | | |
| 2010/0308961 A1 | 12/2010 | Ghabra | | |
| 2010/0321154 A1 | 12/2010 | Ghabra et al. | | |

FOREIGN PATENT DOCUMENTS

DE    10317658 A1    11/2004

OTHER PUBLICATIONS

Chen et al., "Signal Strength Based Indoor Geolocation", IEEE, 2002, pp. 436-439.
German Office Action for corresponding Application No. 10 2012 204 673.9, mailed Jul. 3, 2013, 10 pages.

* cited by examiner

*Primary Examiner* — Mahendra Patel
(74) *Attorney, Agent, or Firm* — Brooks Kushman P.C.

(57) ABSTRACT

In at least one embodiment, an apparatus for determining a locating a wireless device with respect to a vehicle is provided. The apparatus comprises a controller for being operably coupled to a plurality of antennas in a vehicle and each antenna transmitting a first wireless signal to a wireless device to locate a primary antenna. The primary antenna being one of the plurality of antennas that transmitted the first wireless signal at a strongest signal strength. The controller being configured to store a first signal strength for a first control point that is positioned about the vehicle and away from the primary antenna. The controller being configured to determine the location of the wireless device based on a comparison of the first signal strength to the strongest signal strength.

12 Claims, 4 Drawing Sheets

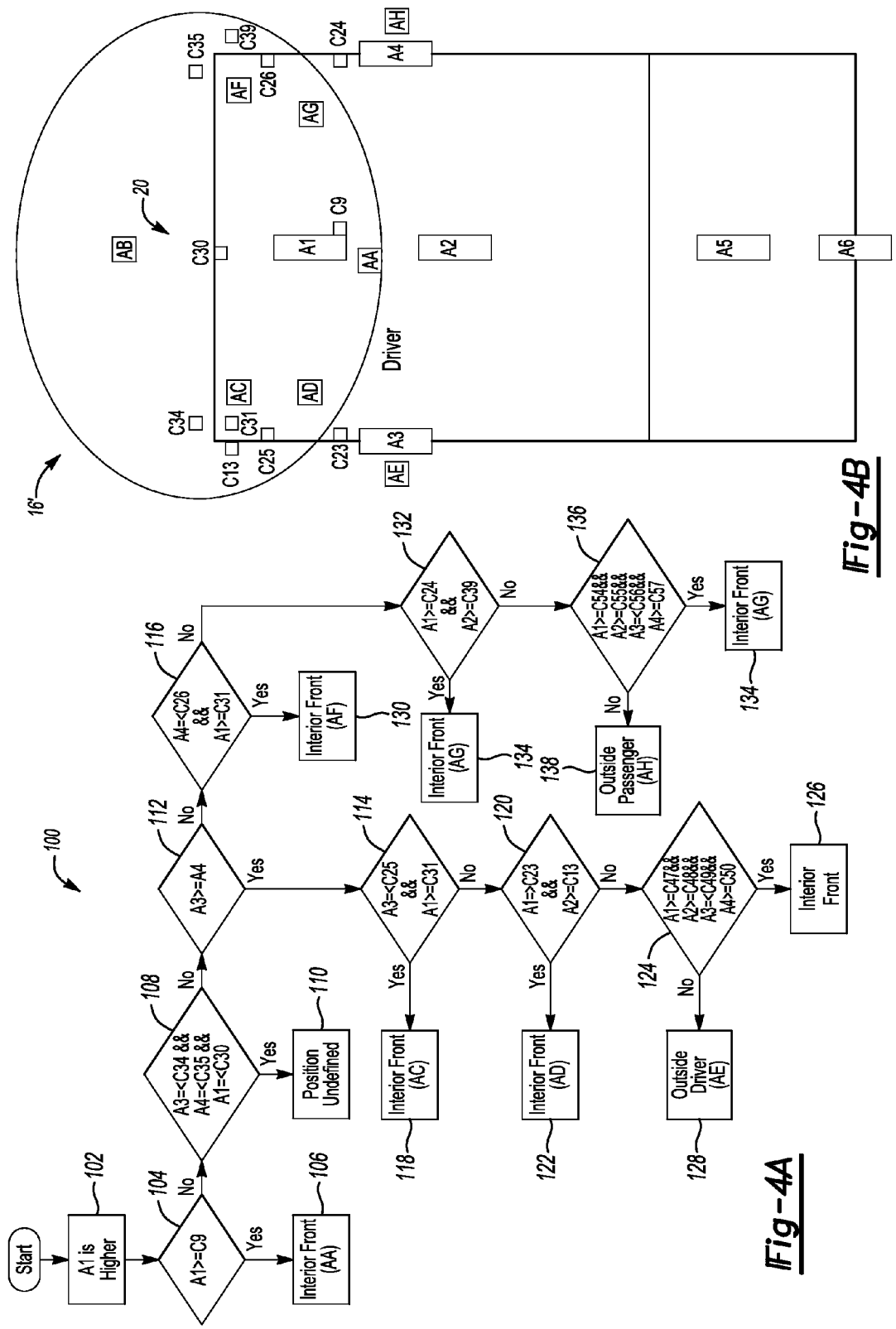

APPARATUS AND METHOD FOR WIRELESS DEVICE DETECTION

CROSS-REFERENCE TO RELATED APPLICATIONS

This application claims the benefit of U.S. provisional Application No. 61/467,740 filed on Mar. 25, 2011, the disclosure of which is hereby incorporated by reference in its entirety.

TECHNICAL FIELD

Embodiments of the present disclosure generally relate to an apparatus and method for wireless device detection in a vehicle.

BACKGROUND

It is known to detect a position of a wireless device with respect to a vehicle. One example for detecting the position of the wireless device is set forth directly below.

U.S. Pat. No. 6,906,612 (the "'612 patent") to Ghabra et al. discloses a vehicle passive entry system including a remote transceiver; and a system and method for detecting the location of the remote transceiver relative to the vehicle. An exterior vehicle antenna is provided for use in transmitting a first signal for receipt by the remote transceiver. An interior vehicle antenna is provided for use in transmitting a second signal for receipt by the remote transceiver. A controller is provided on board the remote transceiver for determining signal strength of the first signal, for determining signal strength of the second signal, and for determining whether the remote transceiver is located inside or outside the vehicle based on the signal strengths of the first and second signals.

SUMMARY

In at least one embodiment, an apparatus for determining a locating a wireless device with respect to a vehicle is provided. The apparatus comprises a controller for being operably coupled to a plurality of antennas in a vehicle and each antenna transmitting a first wireless signal to a wireless device to locate a primary antenna. The primary antenna being one of the plurality of antennas that transmitted the first wireless signal at a strongest signal strength. The controller being configured to store a first signal strength for a first control point that is positioned about the vehicle and away from the primary antenna. The controller being configured to determine the location of the wireless device based on a comparison of the first signal strength to the strongest signal strength.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 4a depicts a method for detecting the location of the wireless device in relation to a front of an interior of the vehicle in accordance to one embodiment;

FIG. 4b depicts antennas and control points in the front of the vehicle for reference with FIG. 4a, FIG. 5a depicts a method for detecting the location of the wireless device in relation to a middle portion of the interior of the vehicle in accordance to one embodiment;

FIG. 5b depicts antennas and control points in the middle portion of the vehicle for reference with FIG. 5a;

FIG. 6b depicts antennas and control points in the rear of the vehicle for reference with FIG. 6a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of electrical devices. All references to the electrical devices and the functionality provided by each, are not intended to be limited to encompassing only what is illustrated and described herein. While particular labels may be assigned to the various electrical devices disclosed, such labels are not intended to limit the scope of operation for the electrical devices. Such electrical devices may be combined with each other and/or separated in any manner based on the particular type of electrical implementation that is desired. It is recognized that any electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Figure 1:
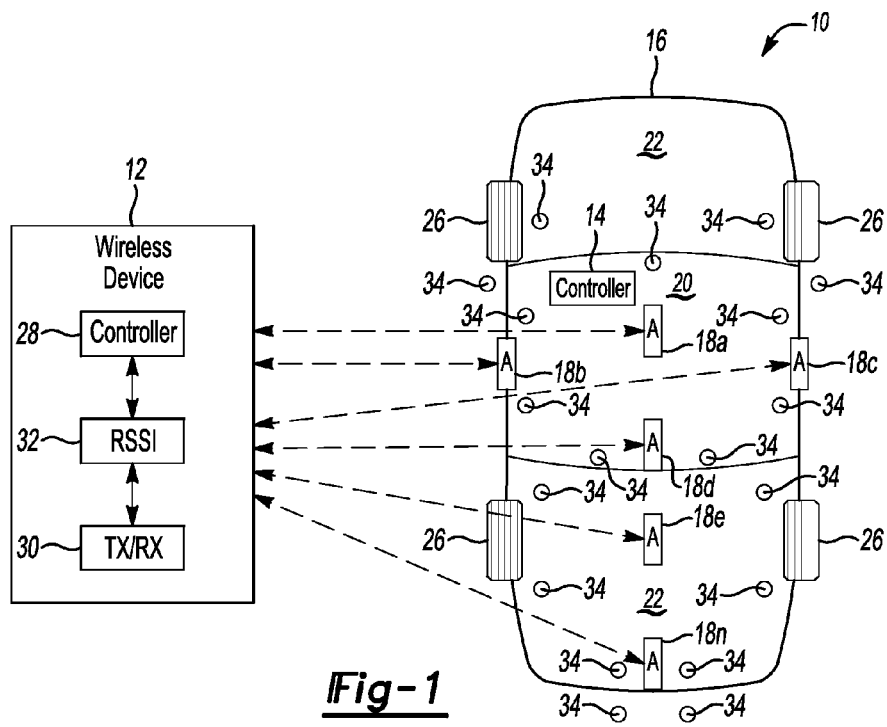
FIG. 1 depicts an apparatus for detecting the location of a wireless device in accordance to one embodiment.

FIG. 1 depicts an apparatus 10 for detecting the location of a wireless device 12 in accordance to one embodiment. The apparatus 10 includes a controller 14 that is positioned on a vehicle 16. The wireless device 12 (or transponder) may be implemented as a keyfob, cell phone, one or more tire pressure sensors, or other suitable remote device that is intended to transmit wireless signals (e.g., radio frequency (RF) or low frequency (LF) signals) to the controller 14 (e.g., an on-board vehicle controller). The apparatus 10 further includes a plurality of antennas (18a-18n) or ("18") positioned within at least one of an interior section 20 and an exterior section 22 of the vehicle 16. The exterior section 22 of the vehicle 16 is generally defined as areas incorporating an engine and a trunk (or boot). The interior section 20 of the vehicle 16 is generally defined as an area in the vehicle 16 in which one or more vehicle occupants are capable of being positioned. In FIG. 1, antenna 18a may be positioned in a console positioned between a driver side and a passenger side, antenna 18b may be positioned between the front driver door and the rear driver-side door, antenna 18c may be positioned between the front passenger door and the rear passenger door, and antenna 18d-18n may be positioned in the rear of the vehicle 16. It is recognized that any one or more antennas 18 may be positioned in any arrangement and within at least one of the interior section 20 and the exterior section 22.

The wireless device 12 may transmit wireless signals that correspond to lock and unlock commands within the controller 14 via one or more of the antennas 18 for purposes of locking/unlocking one or more vehicle doors. Such an operation is generally known as a remote keyless entry (RKE). Location of the wireless device 12 may be desirable with the RKE operation in the event it is necessary to open/unlock a particular door based on the location of the wireless device 12. For example, in the event the wireless device 12 is detected to be exterior to the vehicle and proximate to the driver's door, the controller 12 may only unlock the driver door.

In another embodiment, the wireless device 12 and the controller 14 via may perform a passive entry passive start (PEPS) operation. With PEPS operation, the wireless device 12 and the controller 14 transmit wireless signals to one another via the antennas 18. Such a transmission of wireless signals between the wireless device 12 and the controller 14 occurs passively (e.g., without activation of the wireless device 12). As the user is positioned about the vehicle 16 (e.g., perhaps after toggling a door handle), the controller 14 authenticates the wireless signal that is transmitted from the wireless device 12. The controller 14 controls an unlocking/locking motor (not shown) to unlock the corresponding door that is detected to be closest to the wireless device 12 in response to the authentication. Such an operation generally requires that the controller 14 identify the location of the wireless device 12 so that the door that is detected to be closest to the wireless device 12 is opened while remaining doors remain locked. Likewise, the controller 14 is generally configured to lock one or more of the doors in the event the wireless device 12 is detected to be moving away from the vehicle 16.

An additional aspect for identifying the location of the wireless device 12 relates to the operator being able to start the vehicle 16 via the PEPS operation. For example, when the driver approaches the vehicle 14 and the controller 16 performs the passive unlock operation, the operator may press a switch positioned within the vehicle 16 to start the vehicle 16 (e.g., without the use of an ignition key). This operation is generally predicated on the wireless device 12 being positioned in the interior section 20 (or in the zone in the vehicle 16 typically occupied by the driver) of the vehicle 16. Accordingly, knowledge of the location in terms of the driver in the vehicle 16 is generally desirable for PEPS operation. Location of the driver can be ascertained by detecting the location of the wireless device 12.

The wireless device 12 may also be tire pressure sensor. The tire pressure sensor may be positioned on each tire 26 of the vehicle 16. The ability to detect the location of the tire pressure sensor is generally desirable so that the tire 26 detected to have a low pressure is properly identified. Likewise, the wireless device 12 may be used in connection with, but not limited to, wireless occupancy detection, car finder, and wireless switching applications (e.g., commands generated from wireless devices positioned on doors for controlling unlock, lock, open/close window or other operations performed by a switch on the door).

One implementation for detecting the location of a wireless device 12 is by measuring the signal strength of wireless signals that are transmitted from antenna(s) that are positioned in known sections of the vehicle. The wireless device 12 includes controller 28, a transmitter and receiver circuit 30, and a Received Signal Strength Indicator (RSSI) 32. The RSSI 32 is configured to measure the signal strength of the wireless signal transmitted by the antenna(s) 18. For example, the antenna 18d (as positioned in the interior section 20 of the vehicle 16) is controlled by the controller 14 to transmit a first signal to the wireless device 12 and the antenna 18a (as positioned in the exterior section 20 of the vehicle 16) is controlled by the controller 14 to transmit a second signal to the wireless device 12. The wireless device 12 receives the first and the second signal at the receiver 30 and measures the signal strength of the first signal and the second signal with the RSSI 32. The controller 28 of the wireless device 12 controls the transmitter 30 to transmit a signal back to the controller 14 in the vehicle 16 that identifies the signal strength for each of the first signal and the second signal. If the antenna 18a was detected to transmit the first signal at the highest signal strength, then the controller 14 determines that the wireless device 12 is positioned within the vehicle 16. If the antenna 18d was detected to transmit the second signal at the highest signal strength, then the controller 14 determines that the wireless device 12 is positioned exterior to the vehicle. It is recognized that manner employed above in detecting the location of the wireless device 12 may also be employed with the additional antennas 18b, 18c, 18e, 18n located in the vehicle 16. It is further recognized that the embodiments herein may be used with any number of antennas 18. A vehicle 16 that employs a greater number of antennas 18 (and/or control points) in locating the wireless device 12 may increase the overall resolution in terms of determining location of the wireless device 12.

A plurality of control points 34 are defined about or positioned about the vehicle 16. Such control points 34 are placed at known locations (e.g., at the interior section 20 or at the exterior section 22) or outside of the vehicle 16 to assist in enabling the controller 14 to determine the location of the wireless device 12. For example, the control points 34 reflect locations about the vehicle 16 that each has a pre-designated or predetermined signal strength value associated with it. The apparatus 10 employs a method for determining the location of the wireless device 12 by comparing the signal strength for the various control points 34 against one another or against the signal strength generally associated with various antennas 18. These operations will be discussed in more detail below.

Figure 2:
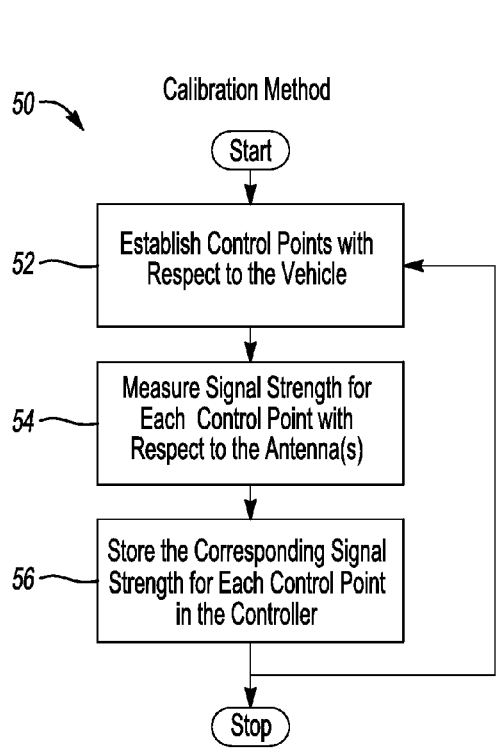
FIG. 2 depicts a method for assigning a signal strength value to one or more of control points about the vehicle in accordance to one embodiment.

FIG. 2 depicts a method 50 for assigning a signal strength value to one or more of the control points 34 about the vehicle 16 in accordance to one embodiment. The method 50 may be performed with the vehicle 16 as in a calibration mode.

In operation 52, each control point 34 is defined in the vehicle 16. For example, a user may establish each control point 34 at pre-designated areas (e.g., either inside or outside) of the vehicle 16 for use along with the antenna(s) 18 to determine the location of the wireless device 12. As illustrated in FIG. 1, various control points 34 are positioned on either side of the antenna 18a (e.g., either inside or outside). The location and number of control points 34 may vary based on the body shape of the vehicle 16 and based on the number of antennas 18 used.

In operation 54, at the control point 34 as defined or established in operation 52, the wireless device 12 is place thereon. It may be necessary to determine the signal strength at the control point 34 with respect to one or more of the antennas 18 positioned in the vehicle 16. Consider for example that it is desirable to ascertain the signal strength for the control point 34a in relation to antenna 18d (see FIG. 1). Obtaining the signal strength for control point 34a may for example be used along with antenna 18d to determine whether the wireless device 12 is positioned inside or outside of the vehicle 16.

While in the calibration mode, the controller 14 controls all of the antennas 18 to sequentially transmit a high frequency (or RF) signal to the wireless device 12 while positioned on the control point 34a within a predetermined amount of time. Each RF signal includes an ID code, which indicates the identity of the antenna 18 that transmitted the RF signal. The wireless device 12 (i) receives the RF signal, (i) ascertains the identity of the antenna 18 that transmitted the RF signal, (iii) determines the signal strength for the RF signal transmitted from the identified antenna 18 and (iv) transmits a signal back to the controller 14 with the signal strength for the identified antenna 18.

In operation 56, the controller 14 stores the signal strength for the control point 34a with respect to antenna 18d. The controller 14 may ignore the other signal strength values received that are associated with the other antennas 18.

In general, the signal strength that is stored for a particular control point 34 is generally based off of which antenna 18 and which control point 34 allows the controller 14 to determine the location of the wireless device 12.

Figure 3:
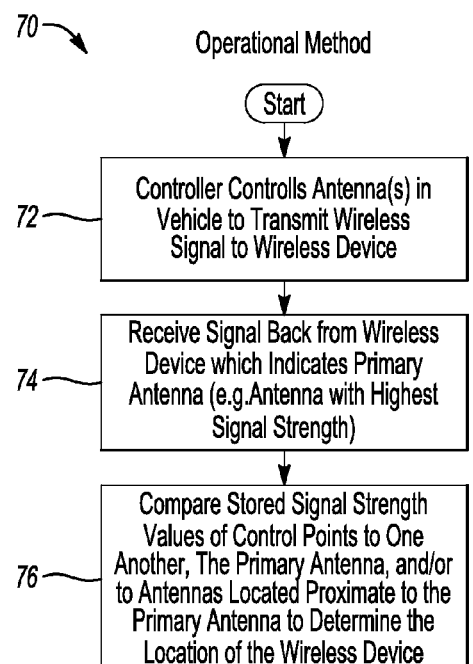
FIG. 3 depicts a method for detecting the location of the wireless device in accordance to one embodiment.

FIG. 3 depicts a method 70 for detecting the location of the wireless device 12 in accordance to one embodiment.

In operation 72, the controller 14 controls the antennas 18 to each transmit a wireless signal to the wireless device 12. The controller 14 may wake up periodically (or in response to a door handle actuation) and control the antennas 18 to transmit the wireless signal to determine if the wireless device 12 is in proximity to the vehicle 16. If the wireless device 12 is close enough to the vehicle 16, the wireless signal from each antenna 18 is received. At that point, the wireless device 12 determines the signal strength for each signal received from each antenna 18.

In operation 74, the controller 14 receives signals back from the wireless device 12 which indicates the signal strength for wireless signal transmitted by each antenna 18. The controller 12 determines which of the antennas 18 transmitted the wireless signal at the highest signal strength (or strongest signal strength). The antenna 18 that transmitted the wireless signal at the strongest signal strength generally indicates that the wireless device 12 is positioned closest to such antenna 18. The antenna 18 that is determined to be closest to the wireless device 12 is generally defined as a primary antenna.

In operation 76, the controller 14 compares the stored signal strength values for one or more of the control points 34 and to the signal strength of the primary antenna 18. If the signal strength for the primary antenna is greater than the signal strength for the control point 34 located proximate to the primary antenna 18 in the vehicle 16, then the controller 14 determines that the wireless device 12 is positioned in an area of the vehicle 16 that is closer to the location of the primary antenna 18. If not, then the controller 14 compares the signal strength for at least one of the primary antenna 18 and one or more of remaining antennas 18 (e.g., the antennas 18 that were not determined to the be primary antenna 18) to additional control points 34. This operation is discussed in more detail in connection with FIGS. 4a-4b, 5a-5b, and 6a-6b.

FIG. 4a depicts a method 100 for detecting the location of the wireless device 12 in relation to a front portion of the interior of a vehicle 16' in accordance to one embodiment. FIG. 4b is provided for reference with the operations of method 100 of FIG. 4a. The vehicle 16' of FIG. 4b is generally similar to the vehicle 16 as depicted in connection with FIG. 1. However, the vehicle 16' in FIG. 4b denotes antennas 18a, 18b, 18c, 18d, 18e, and 18n as A1, A2, A3, A4, A5 and A6; and denotes the control points 34 as C13, C23, C25, C31, C34, etc. The antennas A1, A2, A3, and A4 are generally positioned in the interior section 20 of the vehicle 16' (e.g., when one or more occupants may be positioned while the vehicle 16 is being driven).

In operation 102, the controller 14 determines that the antenna A1 is the primary antenna. The manner in which the controller 14 determines that the antenna A1 is the primary antenna is set forth in operation 74 in connection with FIG. 3.

In operation 104, the controller 14 determines whether the signal strength for antenna A1 is greater than or equal to the signal strength assigned to control point C9. If so, then the method 100 moves to operation 106. If not, then the method 100 moves to operation 108.

In operation 106, the controller 14 determines that the wireless device 12 is positioned in the interior front portion of the vehicle 16'. See FIG. 4b as wireless device 12 is positioned 12 is positioned at AA. This condition implies that the wireless device 12 is positioned near the middle of the interior section 20 of the vehicle 16 and in-between the driver's side and the passenger's side.

In operation 108, the controller 14 determines whether (i) the signal strength for antenna A3 is less than or equal to the signal strength of control point C34; (ii) the signal strength for antenna A4 is less than or equal to the signal strength of control point C35; and (iii) the signal strength for antenna A1 is less than or equal to the signal strength of control point C30. If all three conditions are true, then the method 100 moves to operation 110. If not, then the method 100 moves to operation 112.

In operation 110, the controller 14 is unable to determine the position of the wireless device 12 (e.g. wireless device 12 is positioned at AB away from vehicle 16'). Because the signal strength of the control points C34, C35, and C30 are greater than the signal strengths of the antennas A2, A3, and A4 (and operation 104 is false), it follows that the wireless device 12 is centered with antenna A1 and is located closer to the controller points C34, C35, and C30 than to the antennas A3, A4, and A5. This condition implies that the wireless device 12 is centered with the antenna A1 and is positioned exterior to the vehicle 16'.

In operation 112, the controller 14 determines whether the signal strength at the antenna A3 is greater than or equal to the signal strength of the antenna A4. If this condition is true, then the method 100 moves to operation 114. If not, then the method 100 moves to operation 116.

In operation 114, the controller 14 determines whether the signal strength of the antenna A3 is less than or equal to the signal strength of the control point C25 and whether the signal strength of the antenna A1 is greater than or equal to the signal strength of the control point C31. If this condition is true, then the method 100 moves to operation 118. If not, then the method 100 moves to operation 120.

In operation 118, the controller 14 determines that the wireless device 12 is positioned in the interior front portion of the vehicle 16'. See FIG. 4b as wireless device 12 is positioned at AC. Because the signal strength of the antenna A3 is greater than or equal to the signal strength of the antenna A4; the signal strength of the antennas A3 is less than or equal to the signal strength of the control point C25; the signal strength of the antenna A1 is greater than or equal to the signal strength of the control point C31 (and operation 104, 108 and 114 are false), it follows that the wireless device 12 is positioned near the instrument panel and on the driver's side (e.g., of the vehicle 16 and on the driver side of the vehicle 16').

In operation 120, the controller 14 determines whether the signal strength of the antenna A1 is greater than or equal to the signal strength of the control point C23 and whether the signal strength of the antenna A2 is greater than or equal to the signal strength of the control point C13. If both of these conditions are true, the method 100 moves to operation 122. In not, then the method 100 moves to operation 124.

In operation 122, the controller 14 determines that the wireless device 12 is in the interior front of the vehicle 16' (e.g. See FIG. 4b as wireless device is positioned at AD). Because the signal strength of antenna A3 is greater than or equal to the signal strength of the antenna A4, the signal strength of the antennas A1 and A2 are greater than or equal to the signal strengths of control points C23 and C13, respectively, (and operations 104, 108 and 114 are false) it follows that the wireless device 12 is positioned near the instrument panel and closer to the driver than that of AC.

In operation 124, the controller 14 determines whether the signal strength of the antenna A1 is greater than or equal to the signal strength of the control point C47; whether the signal strength of the antenna A2 is greater than of equal to the signal strength of the control point C48; whether the signal strength of the antenna A3 is less than or equal to the control point C49; and whether the signal strength of the antenna A4 is greater than or equal to the signal strength of the control point C50. If these conditions are true, then the method 100 moves to operation 126. If not, then the method 100 moves to operation 128. Control points C47, C48, C49, and C50 (not shown) are generally positioned in an upper location (e.g., at the headliner) on the driver side.

In operation 126, the controller 14 determines that the wireless device 12 is in the interior front of the vehicle 16' and proximate to the driver side of the vehicle 16' (see AD). See operation 122.

In operation 128, the controller 14 determines that the wireless device 12 is positioned exterior to the vehicle 16' and proximate to the driver side of the vehicle 16' (see AE).

In operation 116, the controller 14 determines whether the signal strength for the antenna A4 is less than or equal to the signal strength of the control point C26 and whether the signal strength for the antenna A1 is greater than or equal to the control point C31. If these conditions are true, then the method 100 moves to operation 130. If not, then the method 100 moves to operation 132.

In operation 130, the controller 14 determines that the wireless device 12 is in the interior front of the vehicle 16'. See FIG. 4b as wireless device 12 is positioned at AF. Because the signal strength of the antenna A4 is less than or equal to the signal strength of the control point C26; and the signal strength of the antenna A1 is greater than or equal to the signal strength of the control point 34 (and operations 104, 108 and 112 are false), it follows that the wireless device 12 is positioned near the instrument panel on the passenger's side.

In operation 132, the controller 14 determines whether the signal strength of the antenna A1 is greater than or equal to the signal strength of the control point C24 and whether the signal strength of the antenna A2 is greater than or equal to the signal strength of the control point C39. If this condition is true, then the method moves to operation 134. If not, the method 100 moves to operation 136.

In operation 134, the controller 14 determines that the wireless device 12 is positioned in the interior front. See FIG. 4b as wireless device 12 is positioned at AG. Because the signal strength of antenna A1 is greater than or equal to the signal strength of the control point C24 and the signal strength of the antenna A2 is greater than or equal to the signal strengths of control point C39 (and operations 104, 108, 112, and 116 are false), it follows that the wireless device 12 is positioned near the instrument panel and closer to the passenger than that of AF.

In operation 136, the controller 14 determines whether the signal strength of the antenna A1 is greater than or equal to the signal strength of the control point C54, whether the signal strength of the antenna A2 is greater than or equal to the signal strength of the control point C55, whether the signal strength of the antenna A3 is less than or equal to the signal strength of the control point C56; and whether the signal strength of the antenna A4 is greater than or equal to the signal strength of the control point C57. If these conditions are true, then the method 100 moves to operation 134. If not, then the method 100 moves to operation 138. Control points C54, C55, C56, and C57 (not shown) are generally positioned in a upper location (e.g., at the headliner) on the passenger side.

In operation 138, the controller 14 determines that the wireless device 12 is in the outside of the vehicle 16' and proximate to the passenger side of the vehicle 16' (see AH).

Figure 5B:
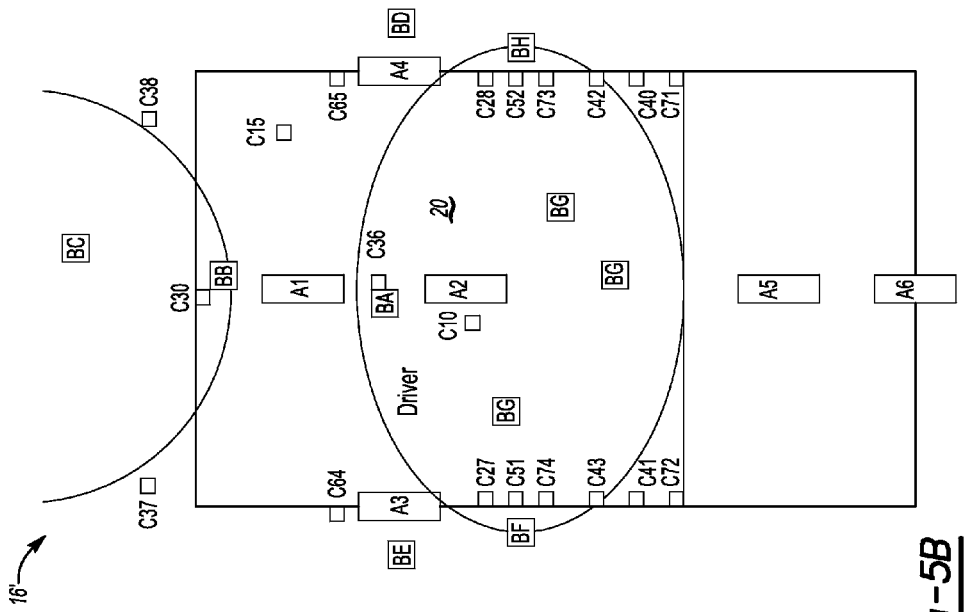
Figure 5A:
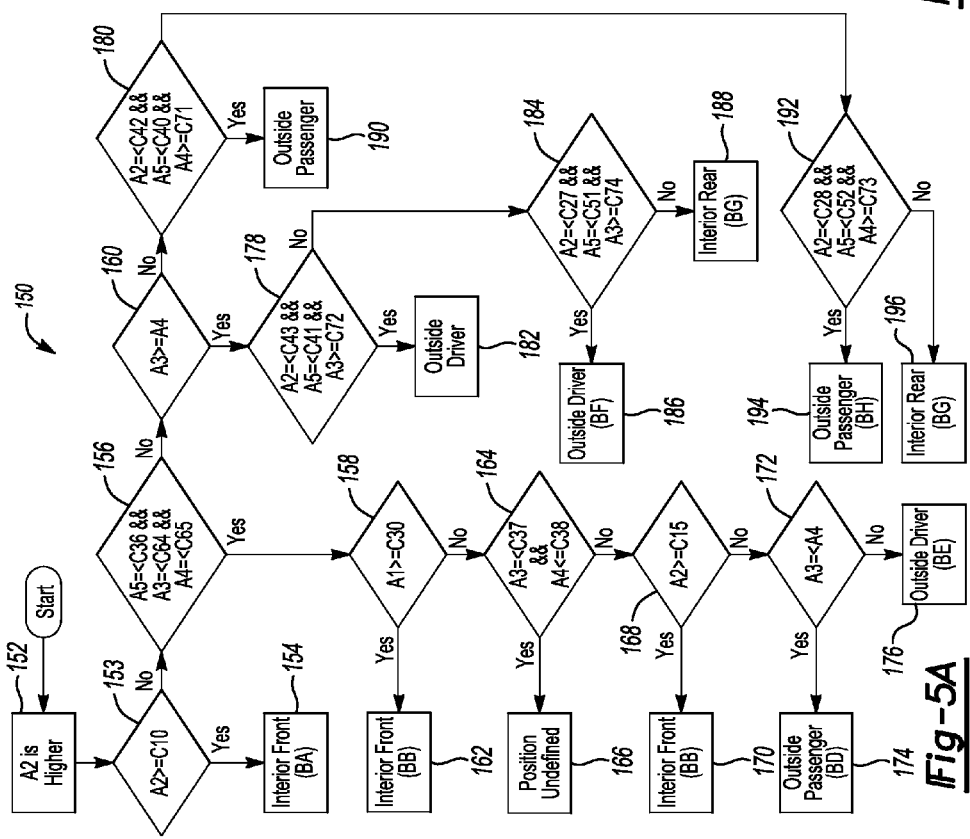

FIG. 5a depicts a method 150 for detecting the location of the wireless device in relation to a middle portion of the interior of the vehicle 16' in accordance to one embodiment. FIG. 5b is provided for reference with the operations of method 150 of FIG. 5a. The vehicle 16' of FIG. 5b is generally similar to the vehicle 16 as depicted in connection with FIG. 1. However, the vehicle 16' in FIG. 5b denotes antennas 18a, 18b, 18c, 18d, 18e, and 18n as A1, A2, A3, A4, A5 and A6; and denotes the control points 34 as C10, C15, C27, C30, C34, etc. The antennas A1, A2, A3 and A4 are generally positioned in the interior section 20 of the vehicle 16'.

In operation 152, the controller 14 determines that the antenna A2 is the primary antenna. The manner in which the controller 14 determines that the antenna A2 is the primary antenna is set forth in operation 74 in connection with FIG. 3.

In operation 153, the controller 14 determines whether the signal strength for the antenna A2 is greater than or equal to the signal strength of the control point C10. If so, then the method 150 moves to operation 154. If not, then the method 150 moves to operation 156.

In operation 154, the controller 14 determines that the wireless device 12 is positioned in the interior, at the center of the vehicle 16' (or center of the interior section 20). See FIG. 5b as wireless device 12 is positioned at BA.

In operation 156, the controller 14 determines whether (i) the signal strength of the antenna A5 is less than or equal to the signal strength of the control point C36, (ii) the signal strength of the antenna A3 is less than or equal to the signal strength of the control point C64, and (iii) the signal strength of the antenna A4 is less than or equal to the signal strength of the control point C65. If these conditions are true, then the method 150 moves to operation 158. If not, then the method 150 moves to operation 160.

In operation 158, the controller 14 determines whether the signal strength of the antenna A1 is greater than the signal strength of the control point C30. If so, then the method 150 moves to operation 162. If not, then the method 150 moves to operation 164

In operation 162, the controller 14 determines that the wireless device 12 is positioned in the interior front of the vehicle 16'. See FIG. 5b as wireless device 12 is positioned at BB. Because the signal strengths of the antennas A5, A3, and A4 are less than or equal to the signal strengths of control points C36, C64, and C65, respectively; and the signal strength of the antenna A1 is greater than the signal strength of the control point C30 (and operation 151 is false), it follows that the wireless device 12 is positioned near the instrument panel of the vehicle 16' (e.g., between the driver side and the passenger side).

In operation 164, the controller 14 determines whether the signal strength for the antenna A3 is less than or equal that the signal strength of the control point C37 and whether the signal strength for the antenna A4 is less than or equal to the signal strength of the control point C38. If so, then the method 150 moves to operation 166. If not, then the method 150 moves to operation 168.

In operation 166, the controller 14 is unable to determine the position of the wireless device 12. The wireless device 12 may be positioned at BC exterior to the vehicle 16'.

In operation 168, the controller 14 determines whether the signal strength of the antenna A2 is greater than the signal strength of the control point C15. If so, then the method 150 moves to operation 170. If not, then the method 150 moves to operation 172.

In operation 170, the controller 14 determines that the wireless device 12 is positioned at the front of the vehicle 16'. See FIG. 5b as wireless device 12 is positioned at BB. See operation 162.

In operation 172, the controller 14 determines whether the signal strength of the antenna A3 is less than or equal to the signal strength of the antenna A4. If so, then the method 150 moves to operation 174. If not, then the method 150 moves to operation 176.

In operation 174, the controller 14 determines that the wireless device 12 is exterior to the vehicle 16' proximate to the passenger side of the vehicle 16'. See FIG. 5b as wireless device 12 is positioned at BD. Because the signal strength of antenna A3 is less than or equal to the signal strength of the antenna A4, (and operations 151, 156, 158, 164, and 168 are false; it follows that the wireless device 12 is positioned exterior to the vehicle and proximate to the passenger side of the vehicle 16'.

In operation 176, the controller 14 determines that the wireless device 12 is positioned exterior to the vehicle 16' proximate to the driver side of the vehicle 16'. See FIG. 5b as wireless device 12 is positioned at BE. Because the signal strength of antenna A3 is greater than or the signal strength of the antenna A4, (and operations 151, 156, 158, 164, and 168 are false); it follows that the wireless device 12 is positioned exterior to the vehicle on the driver side of the vehicle 16'.

In operation 160, the controller 14 determines whether the signal strength of antenna A3 is greater than or equal to the signal strength of antenna A4. If so, then the method 150 moves to operation 178. If not, then the method 150 moves to operation 180.

In operation 178, the controller 14 determines whether (i) the signal strength of the antenna A2 is less than or equal to the signal strength of the control point C43, (ii) the signal strength of the antenna A5 is less than or equal to the signal strength of the control point C41, and (iii) the signal strength of the antenna A3 is greater than or equal to the signal strength of the control point C72. If so, then the method 150 moves to operation 182. If not, then the method 150 moves to operation 184.

In operation 182, the controller 14 determines that the wireless device 12 is positioned outside of the vehicle 16' and on proximate to the driver's side (door) of the vehicle 16'. See FIG. 5b as wireless device 12 is positioned at BF. Because the signal strength of the antenna A2 and the signal strength of the antenna A5 is less than or equal to the signal strength of the control point C43 and the control point C41, respectively; the signal strength of the antenna A3 is greater than or equal to the signal strength of the control point C72, (and operations 151 and 156 are false), it follows that the wireless device 12 is positioned outside of the vehicle and just proximate to the driver's side (or driver's door) of the vehicle 16'.

In operation 184, the controller 14 determines whether (i) the signal strength of the antenna A2 is less than or equal to the signal strength of the control point C27, (ii) the signal strength of the antenna A5 is less than or equal to the signal strength of the control point C51, and (iii) the signal strength of the antenna A3 is greater than or equal to the signal strength of the control point C74. If so, then the method 150 proceeds to operation 186. If not, then the method 150 moves to operation 188.

In operation 186, the controller 14 determines that the wireless device 12 is positioned outside of the vehicle and proximate to the driver's side (door) of the vehicle 16'. See FIG. 5b as wireless device is positioned at BF. Because signal strength of antennas A2 and A5 is less than or equal to signal strength of control point C27 and C51, respectively; the signal strength of the antenna A3 is greater than or equal to the signal strength of the control point C74 (and operations 151, 156, 160, and 178 are false), it follows that the wireless device 12 is positioned outside of the vehicle and proximate to the driver's side (or driver's door) of the vehicle 16'.

In operation 188, the controller 14 determines that the wireless device 12 is positioned in the rear of the interior section 20 of the vehicle 16'. See FIG. 5b as wireless device 12 is positioned at BG. Because at least one of the signal strength of the antennas A2 and A5 is greater than signal strength of control points C27 and C51; or the signal strength of the antenna A3 is less than the signal strength of the control point C74, along with operations 151, 156, and 160 being false, it follows that the wireless device 12 is positioned interior of the interior section 20 of the vehicle 16'.

In operation 180, the controller 14 determines whether (i) the signal strength of the antennas A2 and A5 are less than or equal to the signal strength of the control points C42 and C40, respectively, and (ii) the signal strength of the antenna A4 is greater than or equal to the signal strength of the control point C71. If so, then the method 150 moves to operation 190. If not, then the method 150 moves to operation 192.

In operation 190, the controller 14 determines that the wireless device 12 is positioned outside of the vehicle 16' and proximate to the passenger's side (or door) of the vehicle 16'. See FIG. 5b as wireless device is positioned at BH. Because the signal strength of the antennas A2 and A5 are less than or equal to the signal strength of the control points C42 and C40, respectively, and the signal strength of the antenna A4 is greater than or equal to the signal strength of the control point C71, (and operations 151, 156, and 160 are false), it follows that the wireless device 12 is positioned outside of the vehicle and proximate to the passenger's side (or passenger's door).

In operation 192, the controller 14 determines whether (i) the signal strength of the antennas A2 and A5 are less than or equal to the signal strength of the control points C28 and C52, respectively, and (ii) the signal strength of the antenna A4 is greater than or equal to the signal strength of the control point C73. If so, then the method 150 moves to operation 194. If not, then the method 150 moves to operation 196.

In operation 194, the controller 14 determines that the wireless device 12 is positioned outside of the vehicle 16' and proximate to the passenger's side (or door) of the vehicle 16'. See FIG. 5b as wireless device is positioned at BH. Because the signal strength of the antennas A2 and A5 are less than or equal to the signal strength of the control points C28 and C52, respectively, the signal strength of the antenna A4 is greater than or equal to the signal strength of the control point C73, (and operations 151, 156, 160, and 180 are false), it follows that the wireless device 12 is positioned outside of the vehicle 16' and proximate to the passenger's side (or passenger's door).

In operation 196, the controller 14 determines that the wireless device 12 is positioned in the interior of the vehicle 16' and about the rear of the vehicle 16'. See FIG. 5b as wireless device 12 is positioned at BG.

Figure 6B:
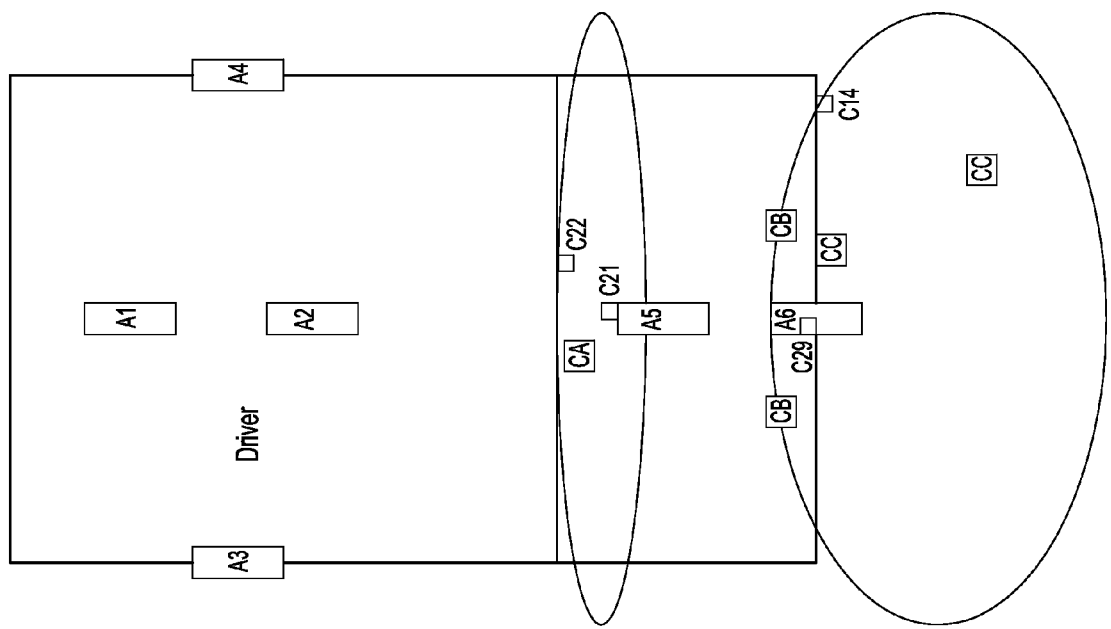
Figure 6A:
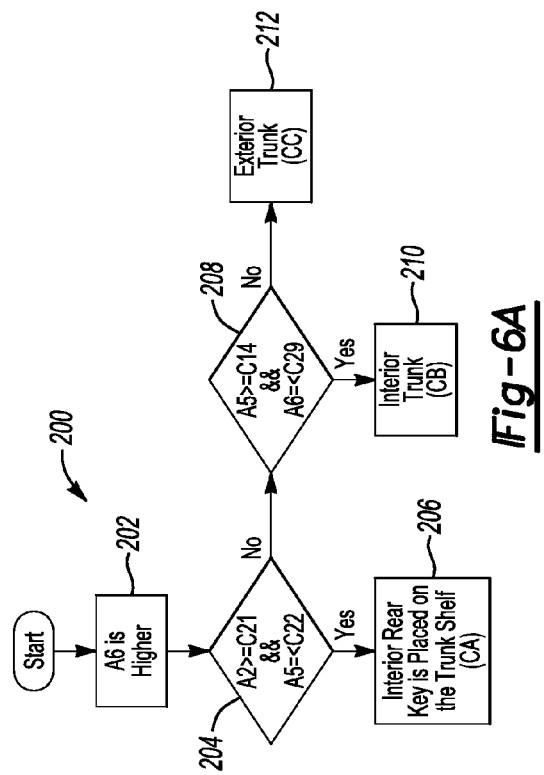
FIG. 6a depicts a method for detecting the location of the wireless device in relation to a rear of the vehicle in accordance to one embodiment.

FIG. 6a depicts a method 200 for detecting the location of the wireless device in relation to a rear of the vehicle in accordance to one embodiment. FIG. 6b is provided for reference with the operations of method 200 of FIG. 6a. The vehicle 16' of FIG. 6b is generally similar to the vehicle 16 as depicted in connection with FIG. 1. However, the vehicle 16' in FIG. 6b denotes antennas 18a, 18b, 18c, 18d, 18e, and 18n as A1, A2, A3, A4, A5, and A6; and denotes the control points 34 as C14, C21, C22, and C29.

In operation 202, the controller 14 determines that the antenna A6 is the primary antenna. The manner in which the controller 14 determines that the antenna A6 is the primary antenna is set forth in operation 74 in connection with FIG. 3.

In operation 204, the controller 14 determines whether (i) the signal strength of the antenna A2 is greater than the signal strength of the control point C21 and (ii) whether the signal strength of the antenna A5 is less than or equal to the signal strength of the control point 22. If so, then the method 200 moves to operation 206. If not, then the method 200 moves to operation 208.

In operation 206, the controller 14 determines that the wireless device 12 is positioned in the interior of the vehicle 16' and in the rear of the vehicle 16' (e.g., wireless device 12 is placed on shelf of trunk). See FIG. 6b as wireless device 12 is positioned at CA (e.g., interior rear, where the wireless device 12 is placed on shelf of the trunk). Because the signal strength of the antenna A2 is greater than the signal strength of the control point C21 and the signal strength of the antenna A5 is less than or equal to the signal strength of the control point 22, if follows that the wireless device 12 is positioned interior to the vehicle 16' and on shelf of the trunk of the vehicle 16'.

In operation 208, the controller 14 determines whether (i) the signal strength of the antenna A5 is greater than the signal strength of the control point C14 and (ii) whether the signal strength of the antenna A6 is less than or equal to the signal strength of the control point C29. If so, then the method 200 moves to operation 210. If not, then the method 200 moves to operation 212.

In operation 210, the controller 14 determines that the wireless device 12 is positioned in the trunk of the vehicle 16'. See FIG. 6b as wireless device 12 is positioned at CB. Because the signal strength of the antenna A5 is greater than the signal strength of the control point C14, the signal strength of the antenna A6 is less than or equal to the signal strength of the control point C29, (and operation 209 is false), it follows that the wireless device 12 is positioned inside the trunk.

In operation 212, the controller 12 determines that the wireless device 12 is positioned exterior to the trunk of the vehicle 16'. See FIG. 6b as wireless device 12 is positioned at CC. Because the signal strength of the antenna A5 less than the signal strength of the control point C14 or the signal strength of the antenna A6 is greater than the signal strength of the control point C29, (and operation 204 is false), it follows that the wireless device 12 is positioned exterior to the trunk.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for determining a location of a wireless device with respect to a vehicle, the apparatus comprising:
    an on-board vehicle controller for being operably coupled to a plurality of antennas in a vehicle and each antenna transmitting a first wireless signal to the wireless device to locate a primary antenna, the primary antenna being one of the plurality of antennas that transmitted the first wireless signal at a strongest signal strength, the controller being configured to:
        store a first signal strength for a first control point that is positioned about the vehicle and away from the primary antenna;
        determine the location of the wireless device based on a comparison of the first signal strength to the strongest signal strength;
        determine that the wireless device is positioned proximate to the primary antenna if the strongest signal strength is greater than the first signal strength; and
        store a second signal strength for a second control point positioned about the vehicle and away from a first antenna of the plurality of antennas, wherein the first antenna is different than the primary antenna.

2. The apparatus of claim 1 wherein the on-board vehicle controller is further configured to determine that the wireless device is positioned away from the primary antenna and proximate to a second antenna of the plurality of antennas in the event the first signal strength is greater than the strongest signal strength.

3. The apparatus of claim 1 wherein the on-board vehicle controller is further configured to compare the second signal strength of the second control point to a signal strength associated with the first antenna in the event the first signal strength is greater than the strongest signal strength.

4. The apparatus of claim 3 wherein the on-board vehicle controller is further configured to determine that the wireless device is positioned proximate to the first antenna if the signal strength of the first antenna is greater than the second signal strength of the second control point.

5. A method for determining a location of a wireless device with respect to a vehicle, the method comprising:
    transmitting from a plurality of antennas in the vehicle that is operably coupled to an on-board vehicle controller, a first wireless signal from each antenna to locate a primary antenna, the primary antenna being one of the plurality of antennas that transmitted the first wireless signal at a strongest signal strength;
    providing a first signal strength for a first control point that is positioned about the vehicle and away from the primary antenna;
    comparing the strongest signal strength to the first signal strength to determine the location of the wireless device;
    determining that the wireless device is positioned proximate to the primary antenna if the strongest signal strength is greater than the first signal strength; and
    providing a second signal strength for a second control point that is positioned about the vehicle and away from a first antenna of the plurality of antennas, wherein the first antenna is different than the primary antenna.

6. The method of claim 5 further comprising determining that the wireless device is positioned away from the primary antenna and proximate to a second antenna of the plurality of antennas if the first signal strength is greater than the strongest signal strength.

7. The method of claim 5 further comprising comparing the second signal strength of the second control point to a signal strength of the first antenna in the event the first signal strength is greater than the strongest signal strength.

8. The method of claim 7 further comprising determining that the wireless device is positioned about the first antenna if the signal strength of the first antenna is greater than the second signal strength of the second control point.

9. An apparatus for detecting a location of a wireless device with respect to a vehicle, the apparatus comprising:
- a plurality of antennas for being positioned about the vehicle, each antenna for transmitting a first wireless signal to the wireless device; and
- an on-board vehicle controller for being operably coupled to the plurality of antennas and being configured to:
  - receive a plurality of second wireless signals from the wireless device, each second wireless signal being indicative of a signal strength for each first wireless signal transmitted by each antenna;
  - select a primary antenna from the plurality of antennas based on each second wireless signal, the primary antenna being indicative of the antenna that transmitted the first wireless signal at a strongest signal strength;
  - store a first signal strength for a first control point positioned about the vehicle and away from the primary antenna;
  - detect the location of the wireless device based on a comparison of the first signal strength to the strongest signal strength;
  - detect that the location of the wireless device is positioned proximate to the primary antenna if the strongest signal strength is greater than the first signal strength; and
  - store a second signal strength for a second control point positioned at a location about the vehicle and away from a first antenna of the plurality of antennas, wherein the first antenna is different than the primary antenna.

10. The apparatus of claim 9 wherein the on-board vehicle controller is further configured to detect that the location of the wireless device is positioned away from the primary antenna and proximate to a second antenna of the plurality of antennas in the event the first signal strength is greater than the strongest signal strength.

11. The apparatus of claim 9 wherein the on-board vehicle controller is further configured to compare the second signal strength of the second control point to a signal strength of the first antenna in the event the first signal strength is greater than the strongest signal strength.

12. The apparatus of claim 11 wherein the on-board vehicle controller is further configured to detect that the location of the wireless device is positioned proximate to the first antenna if the signal strength of the first antenna is greater than the second signal strength of the second control point.

* * * * *